(12) United States Patent
Bayer et al.

(10) Patent No.: US 8,667,680 B2
(45) Date of Patent: Mar. 11, 2014

(54) METHOD FOR REPLACING AN INNER DISK ELEMENT OF AN INTEGRALLY BLADED DISK

(75) Inventors: Erwin Bayer, Dachau (DE); Karl-Hermann Richter, Markt Indersdorf (DE)

(73) Assignee: MTU Aero Engines AG, Munich (DE)

(*) Notice: Subject to any disclaimer, the term of this patent is extended or adjusted under 35 U.S.C. 154(b) by 180 days.

(21) Appl. No.: 13/129,295

(22) PCT Filed: Nov. 7, 2009

(86) PCT No.: PCT/DE2009/001581
§ 371 (c)(1),
(2), (4) Date: May 13, 2011

(87) PCT Pub. No.: WO2010/054634
PCT Pub. Date: May 20, 2010

(65) Prior Publication Data
US 2011/0219616 A1 Sep. 15, 2011

(30) Foreign Application Priority Data
Nov. 13, 2008 (DE) .......................... 10 2008 057 160

(51) Int. Cl.
*B21K 25/00* (2006.01)
(52) U.S. Cl.
USPC .................. 29/889.22; 29/402.02; 29/402.08; 29/417; 29/889; 29/889.1; 29/889.21; 228/160; 228/168; 415/208.2; 415/209.3; 415/209.4
(58) Field of Classification Search
USPC ......... 29/889.1, 402.02, 402.08, 889.21, 417, 29/889.22; 228/160, 168; 415/189, 208.2, 415/209.3, 209.4
See application file for complete search history.

(56) References Cited

U.S. PATENT DOCUMENTS 5,772,401 A * 6/1998 Canova .......................... 415/189
2003/0223873 A1 12/2003 Carrier

FOREIGN PATENT DOCUMENTS

| DE | 2442739 A1 | 3/1976 |
| DE | 10340823 A1 | 3/2005 |
| DE | 102006022164 A1 | 11/2007 |

OTHER PUBLICATIONS

PCT: International Search Report and Written Opinion of PCT/DE2009/001581; Jan. 22, 2010; 9 pages.
PCT: International Search Report and Written Opinion of PCT/DE2009/001581; Jan. 22, 2010; 10 pages.

\* cited by examiner

*Primary Examiner* — Richard Chang
(74) *Attorney, Agent, or Firm* — Howison & Arnott, LLP

(57) ABSTRACT

The present invention relates to a method for replacing an inner disk element of a blade integrated disk wherein the blade integrated disk has a plurality of recesses in the form of axial through-bores in the joining area. The method begins with filling the axial through-bores, after which the inner disk element of the blade integrated disk is separated from the remaining blade ring. Next a new inner disk element is inserted into the remaining blade ring and the new inner disk element and the remaining blade ring are joined. Finally the axial through-bores are restored.

19 Claims, 2 Drawing Sheets

METHOD FOR REPLACING AN INNER DISK ELEMENT OF AN INTEGRALLY BLADED DISK

CROSS-REFERENCE TO RELATED APPLICATIONS

This application is a U.S. National Phase application submitted under 35 U.S.C. §371 of Patent Cooperation Treaty application serial no. PCT/DE2009/001581, filed Nov. 7, 2009, and entitled METHOD FOR REPLACING AN INNER DISK ELEMENT OF AN INTEGRALLY BLADED DISK, which application claims priority to German patent application serial no. DE 10 2008 057 160.1, filed Nov. 13, 2008, and entitled VERFAHREN ZUM AUSTAUSCH EINES INNEREN SCHEIBENELEMENTS EINER INTEGRAL BESCHAUFELTEN SCHEIBE.

Patent Cooperation Treaty application serial no. PCT/DE2009/001581, published as WO 2010/054634, and German patent application serial no. DE 10 2008 057 160.1, are incorporated herein by reference.

TECHNICAL FIELD

The present invention relates to a method for replacing an inner disk element of a blade integrated disk, a so-called BLISK or integrally bladed disk. The BLISK or blade integrated disk here is also synonymous for a blade integrated ring, a so-called BLING or integrally bladed ring.

BACKGROUND

It is known from the document DE 10 2006 022 164 A1 that a rotor element (BLISK or BLING) may be reinforced for finished machining with a high mechanical load. This is necessary in particular because the rotor element is dimensioned for its use and loads may occur during finishing and/or processing (e.g., repairs) that are greater than the loads during use. It is therefore possible for the rotor element to undergo unwanted deformation during processing. Therefore the document cited above provides a method for reinforcing such components, to prevent unwanted deformation or to at least largely restrict it.

However, this method is suitable only for reinforcing rotor elements having a very specific design. More precisely, this method is suitable only for reinforcing revolving recesses in the turbine BLISK with a radially exterior bordering wall.

However, most of the BLISKs and BLINGs currently in use have axial bores, so-called pressure relief bores, which serve to save on weight while also providing better ventilation. The weight savings are important in such rotor elements that are used in aircraft turbines in particular.

In the current design of turbine BLISKS, an EB-welded blade ring is joined to a hub by electron beam welding. Then the pressure relief bores are created in the area of the zone of joining to the blade ring and along the axial seam. These pressure relief bores would prevent renewed joining by electron beam welding in a repair.

Turbine BLISKs are mostly manufactured today using two different materials for the inner disk element and the blade ring. The inner disk element is usually of a lower quality than the blade ring and is limited with respect to its lifetime. On the other hand, the blade ring is a class 2 component whose lifetime is not limited.

SUMMARY AND DESCRIPTION

An object of the present disclosure is to provide a method with the aid of which the inner disk element can be replaced on turbine BLISKs having axial pressure relief bores.

The object is achieved with the method as described and claimed herein. Advantageous further developments of the method are the subject matter of further disclosure and claims herein.

In one embodiment, the method for replacing an inner disk element of a blade integrated disk, wherein the blade integrated disk has a plurality of recesses in the form of axial through-bores in the joining area, has the following sequence. First the axial through-bores in the blade integrated disk are filled and the inner disk element of the radially bladed disk is separated from the remaining blade ring. Next a new inner disk element is inserted into the remaining blade ring and the new inner disk element and the remaining blade ring are joined. Next the axial through-bores are restored.

The advantage of the method according to this embodiment is that, when using the inner disk element of the blade integrated disk (BLISK), it is not necessary to replace the entire component but instead the relatively favorable inner disk element may be replaced and the relatively expensive blade ring may be used further. It is pointed out here again that a blade integrated disk (BLISK) is also synonymous for a blade integrated ring (BLING). In this case, instead of the inner disk element, the inner ring is naturally separated and replaced.

In some embodiments of the method mentioned above, the axial through-bores are filled by inserting shrunken molded parts, and the axial through-bores are restored by removing the molded parts that have been inserted, these steps being accomplished advantageously in this way.

Therefore, the filling of the through-bores can be accomplished very quickly and inexpensively. The molded parts may either be prepared individually for the respective BLISK or they may be standardized and kept in stock. Differently shaped through-bores may also be provided in the blade integrated disk, so that differently shaped molded parts are needed accordingly.

In some embodiments of the present method, the molded parts are designed from the same material as the inner disk element.

In this case, the material properties are identical over the entire separating joint (and later the joining joint), which simplifies processing. This is true in particular of the thermal expansion coefficient, so that no stresses or gaps occur in the area of the molded parts even in heating of the blade integrated disk, e.g., during joining.

Additionally advantageously in some embodiments of the present method, the filling of the axial through-bores is accomplished with the aid of the method of cold kinetic compacting. Furthermore, restoration of the axial through-bores is accomplished by redrilling them.

With the aid of the method of cold kinetic compacting, the through-bores can be filled without creating major thermal stresses in the blade integrated disk. Therefore, thermal deformation and/or stressing of the blade integrated disk is largely prevented.

Precision machining of the joining zone is advantageously performed in some embodiments of the present method before inserting the new inner disk element into the remaining blade ring.

This step is advantageous in particular when the blade integrated disk has a coating of a material different from the core material. When separating them, shavings of the cover material may be formed, for example, and then adhere in the area of the core material. Without a precision machining of the joining zone, it would be theoretically possible in this way for inclusions of the cover material to be formed in the core material of the blade integrated disk, which could have a negative effect on the strength or endurance. This can be reliably prevented by precision machining of the joining zone.

The joining of the new inner disk element and the remaining blade ring is accomplished advantageously in the present method by means of electron beam welding or rotational friction welding.

These joining methods are suitable in particular because they are associated with relatively low heating of the blade integrated disk. Furthermore, this heating is greatly limited locally. Therefore, a complex and extensive reworking of the blade integrated disk can be avoided.

BRIEF DESCRIPTION OF THE DRAWINGS

The present invention and its advantageous refinements are better understandable with reference to the accompanying figures.

DETAILED DESCRIPTION

An exemplary embodiment of the method according to the invention is described below.

Figure 2:
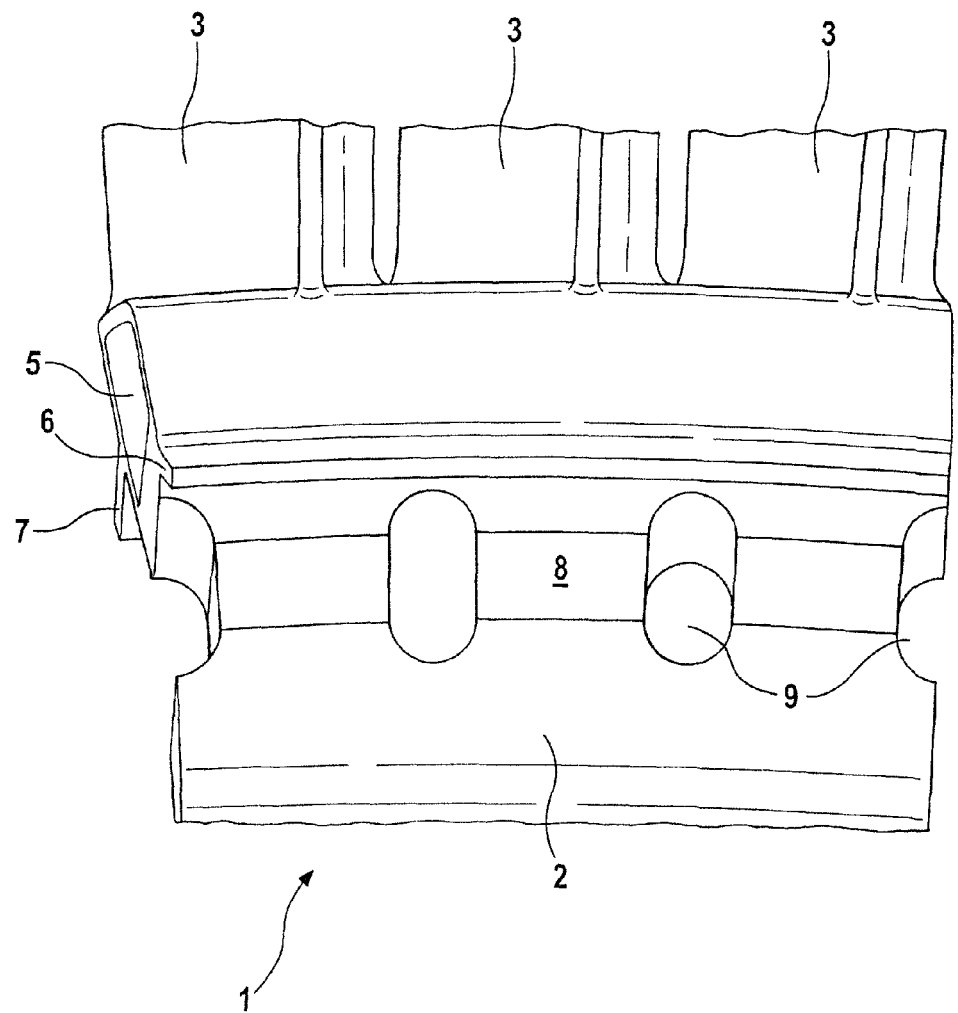
FIG. 2 shows a perspective sectional view of a blade integrated disk in which a through-bore has been filled.

The blade integrated disk 1 of this exemplary embodiment consists of an inner disk element 2 and blades 3. The inner disk element 2 also has an axial protrusion 4. The blades 3 are attached to the inner disk element 2 in a joining area 8 at their base 5, which is provided with two protrusions 6, 7. Axial through-bores 9, which are provided in the joining area 8 between the inner disk element 2 and the base 5 of the blades 3, serve as pressure relief bores. In FIG. 2 one of the through-bores 9 has been filled up. The concept of the joining area defines the area in which the through-bores 9 are situated, whereas the concept of the joining zone comprises only that area which is influenced directly by the joining operation, i.e., for example, the area in which a weld is executed.

The method according to the invention according to this exemplary embodiment takes place as described below.

Figure 1:
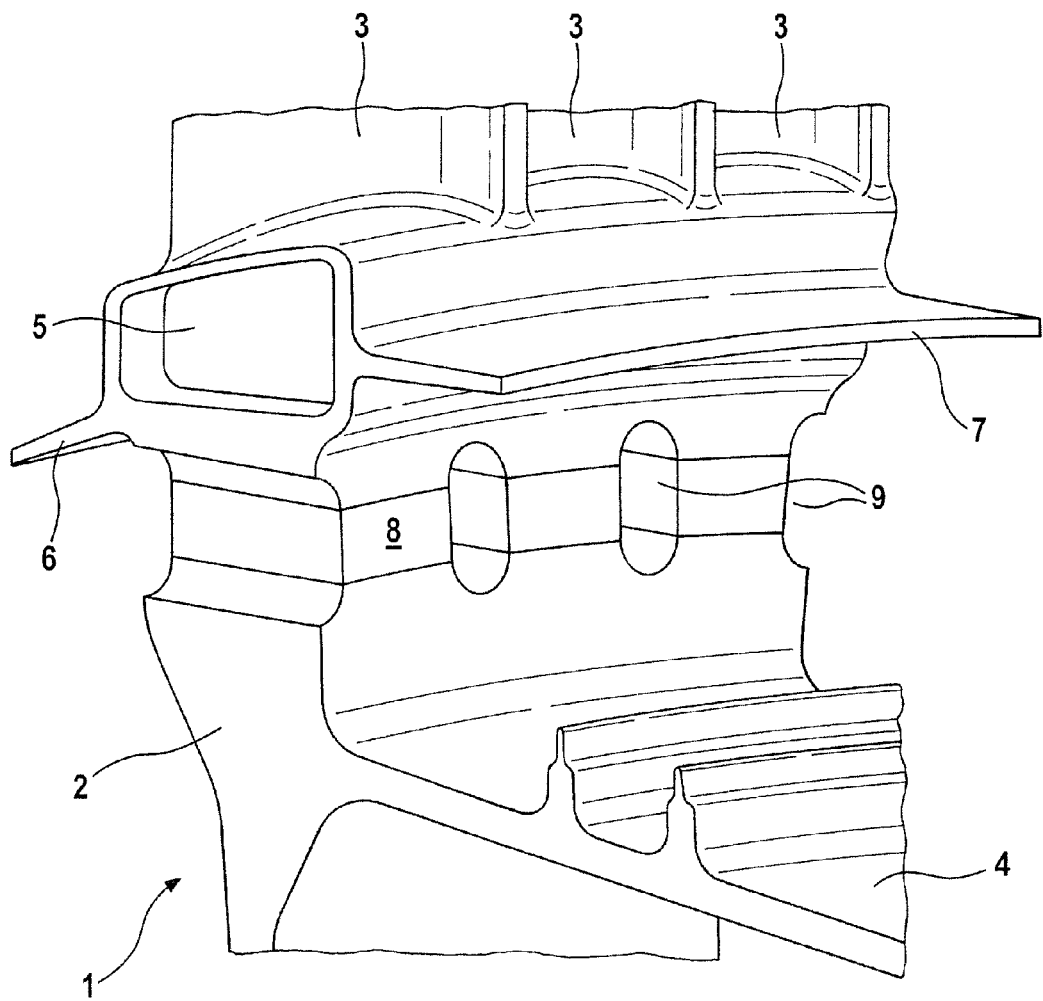
FIG. 1 shows a perspective sectional view of a blade integrated disk.

With the blade integrated disk 1 shown in FIG. 1, the axial through-bores 9 are filled up with the aid of the cold kinetic compacting method, as illustrated for an axial through-bore 9 in FIG. 2. In this method, which is also referred to as the K3 method (from German: kaltkinetische Kompaktierung=3K (i.e., cold kinetic compacting=CKC)) and/or as the cold spray method, a spray additive is accelerated to such a high speed that the kinetic energy of the spray additive by itself is sufficient to form a dense layer composite on the workpiece when the spray additive strikes the workpiece. Accordingly, a supply of heat may be completely omitted, so that the requirements for low-oxide layers can be met because there is no reaction of the materials with the ambient gases due to the low temperatures.

After filling up the axial through-bores 9 in the joining area 8, the inner disk element 2 of the radially bladed disk 1 is separated from the remaining blade ring 3, 5, 6, 7 with the aid of any known separation method. Separation methods which do not require any great input of heat into the blade integrated disk 1 are especially preferred here because a deformation of the blade integrated disk 1 can thereby be minimized.

In this exemplary embodiment, precision machining of the joining zone is performed after separating the inner disk element 2. The joining zone here corresponds to the separation face of the blade ring 3, 5, 6, 7 and the corresponding surface of the newly inserted inner disk element 2.

Next, the new inner disk element 2 is inserted into the remaining blade ring 3, 5, 6, 7 and positioned accurately.

In this exemplary embodiment, the subsequent joining of the new inner disk element and the remaining blade ring 3, 5, 6, 7 is accomplished by means of electron beam welding (also referred to as EB welding). However, a friction welding method may also be used, e.g., rotary friction welding as an alternative.

Finally, the axial through-bores 9 in the joining area 8 are restored by redrilling them in the same locations. This step is performed in the same way as in new production of a blade integrated disk 1.

A blade integrated disk 1, or in this exemplary embodiment, a turbine BLISK 1 for an aircraft turbine was repaired in a relatively short period of time and at a low cost by using the method described above.

This repair option is an important prerequisite for acceptance of a turbine BLISK 1 by the customer. For the manufacturer and/or repair service, the method according to the invention also offers the advantage that after the pressure relief bores 9 have been filled and the disk 2 has been separated, it is possible to return to the standard process of manufacturing a new part. This also shortens the development time for the repair. It is also possible to reuse the device concept.

In the method of cold kinetic compacting, turbine BLISK 1 is also put under very little thermal load (<200° C.) which is why there is no deformation of the turbine BLISK 1. Furthermore, the layer created by this method is dense, so that the material properties remain constant over the entire extent in reconnection.

This exemplary embodiment is not intended to limit the scope of the present invention but instead serves only to illustrate the method according to the invention.

The invention claimed is:

1. A method for replacing an inner disk element of a blade integrated disk, in which the blade integrated disk has a plurality axial through-bores in a joining area disposed between the inner disk element having no blades and a remaining blade ring having a plurality of blades, the method comprising the following steps:
   filling up a plurality of axial through-bores in a joining area of a blade integrated disk between a first inner disk element having no blades and a remaining blade ring having a plurality of blades;
   separating the first inner disk element of the blade integrated disk from the remaining blade ring, the separating being performed after the filling up of the through-bores;
   inserting a new inner disk element into the remaining blade ring in place of the first inner disk element;
   joining the new inner disk element and the remaining blade ring; and
   restoring the axial through-bores in the joining area between the new inner disk element and the remaining blade ring.

2. The method according to claim 1, wherein:
   the filling up of the axial through-bores is accomplished by insertion of molded parts; and
   restoration of the axial through-bores is accomplished by removal of the inserted molded parts.

3. The method according to claim 2, wherein the molded parts inserted into the axial through-bores are shrunken molded parts.

4. The method according to claim 2, wherein the molded parts are made of the same material as the inner disk element.

5. The method according to claim 1, wherein the axial through-bores are filled up using cold kinetic compacting.

6. The method according to claim 1, wherein the restoration of the axial through-bores is accomplished by redrilling them.

7. The method according to claim 1, wherein precision machining of the joining zone is performed before inserting the new inner disk element into the remaining blade ring.

8. The method according to claim 1, where the joining of the new inner disk element and the remaining blade ring is accomplished by one of electron beam welding and rotary friction welding.

9. A method for replacing an inner element of a integrally bladed rotor, the integrally bladed rotor being one of an integrally bladed disk ("BLISK") and an integrally bladed ring ("BLING"), the inner element in the case of a BLISK being an inner disk element and the inner element in the case of a BLING being an inner ring element, the integrally bladed rotor further comprising a blade ring surrounding the inner element, the mutually-adjacent areas of the blade ring and the inner element defining a joining area within which are disposed a plurality of axial through-bores formed through the integrally bladed rotor, the method comprising the following steps:
   filling up a plurality of axial through-bores in a joining area disposed between an inner disk element having no blades and a remaining blade ring having a plurality of blades of an integrally bladed rotor;
   separating the inner element of the integrally bladed rotor from the remaining blade ring, the separation taking place in the joining area and after the filling up of the through-bores;
   inserting a new inner element into the remaining blade ring;
   joining the new inner element and the remaining blade ring, the joining taking place in the joining area; and
   restoring the axial through-bores in the joining area between the new inner disk element and the remaining blade ring.

10. The method according to claim 9, wherein:
   the filling up of the axial through-bores is accomplished by insertion of molded parts; and
   restoration of the axial through-bores is accomplished by removal of the inserted molded parts.

11. The method according to claim 10, wherein the molded parts inserted into the axial through-bores are shrunken molded parts.

12. The method according to claim 10, wherein the molded parts are made of the same material as the inner element.

13. The method according to claim 9, wherein the axial through-bores are filled up using cold kinetic compacting.

14. The method according to claim 9, wherein the restoration of the axial through-bores is accomplished by redrilling them.

15. The method according to claim 9, wherein precision machining of the joining zone is performed before inserting the new inner element into the remaining blade ring.

16. The method according to claim 9, where the joining of the new inner element and the remaining blade ring is accomplished by one of electron beam welding and rotary friction welding.

17. A method for replacing an inner disk element of an integrally bladed disk ("BLISK"), the BLISK comprising the inner disk element having no blades and a blade ring having a plurality of blades surrounding the inner disk element, wherein the mutually-adjacent areas of the blade ring and the inner disk element define a joining area within which are disposed a plurality of axial through-bores, the method comprising the following steps:
   filling up a plurality of axial through-bores in a joining area of a BLISK between a first inner disk element having no blades and a remaining blade ring having a plurality of blades;
   separting the first inner disk element of the BLISK from the remaining blade ring, the separating taking place in the joining area and being performed after the filling up of the through-bores;
   inserting a new inner disk element into the remaining blade ring in place of the first inner disk element;
   joining the new inner disk element and the remaining blade ring, the joining taking place in the joining area; and
   restoring the axial through-bores in the joining area between the new inner disk element and the remaining blade ring.

18. The method according to claim 17, wherein the step of filling up the axial through-bores includes accelerating a spray additive to a sufficiently high speed that the kinetic energy of the spray additive as it strikes the BLISK in the area of the axial through-bores is sufficient to form a dense layer composite on the BLISK.

19. The method according to claim 18, wherein during the step of filling up the axial through-bores, the temperature of the BLISK remains less than 200 degrees C.

\* \* \* \* \*